(12) United States Patent
Sjoberg et al.

(10) Patent No.: US 7,403,892 B2
(45) Date of Patent: Jul. 22, 2008

(54) AMR MULTIMODE CODEC FOR CODING SPEECH SIGNALS HAVING DIFFERENT DEGREES FOR ROBUSTNESS

(75) Inventors: Johan Sjoberg, Stockholm (SE); Stefan Bruhn, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 625 days.

(21) Appl. No.: 10/487,058

(22) PCT Filed: Aug. 22, 2002

(86) PCT No.: PCT/SE02/01510
§ 371 (c)(1),
(2), (4) Date: Aug. 11, 2004

(87) PCT Pub. No.: WO03/019850
PCT Pub. Date: Mar. 6, 2003

(65) Prior Publication Data
US 2004/0267519 A1 Dec. 30, 2004

(30) Foreign Application Priority Data
Aug. 22, 2001 (SE) .................................... 0102849

(51) Int. Cl.
*G10L 19/00* (2006.01)
*H04J 3/22* (2006.01)
(52) U.S. Cl. .................. 704/201; 370/465; 370/466
(58) Field of Classification Search ............ 704/200, 704/201, 203, 226, 500, 502; 370/465, 468, 370/466; 455/63.1, 501, 67.13
See application file for complete search history.

(56) References Cited

U.S. PATENT DOCUMENTS

| 5,812,786 | A | * | 9/1998 | Seazholtz et al. | ........... 709/233 |
| 6,167,031 | A | * | 12/2000 | Olofsson et al. | ........... 370/252 |
| 6,167,259 | A | * | 12/2000 | Shah | ........................ 455/424 |
| 6,256,487 | B1 | * | 7/2001 | Bruhn | ........................ 455/352 |
| 6,266,342 | B1 | * | 7/2001 | Stacey et al. | ................ 370/465 |
| 6,421,527 | B1 | * | 7/2002 | DeMartin et al. | ........ 455/67.13 |
| 6,667,991 | B1 | * | 12/2003 | Tzannes | ...................... 370/465 |
| 6,832,195 | B2 | * | 12/2004 | Johnson | ..................... 704/270 |
| 7,010,001 | B2 | * | 3/2006 | Odenwalder | ................ 370/476 |
| 7,149,228 | B1 | * | 12/2006 | Kirla | ........................... 370/465 |
| 2004/0062274 | A1 | * | 4/2004 | Hakansson et al. | .......... 370/468 |

FOREIGN PATENT DOCUMENTS
EP 0986206 A1 3/2000

OTHER PUBLICATIONS

Bruhn et al., "Concepts and solutions for link adaptation and inband signaling for the GSM AMR speech coding standard," 1999 IEEE 49th Vehicular Technology Conference, May 16-20, 1999, vol. 3, pp. 2451 to 2455.*

* cited by examiner

*Primary Examiner*—Martin Lerner
(74) *Attorney, Agent, or Firm*—Thomas Bethea, Jr.

(57) ABSTRACT

A delay unit is provided to delay adapting modes of a codec if channel communication conditions are improving. A less robust mode having a higher intrinsic quality is selected only after some delay. The quality of the communication is measured to give quality values for successive measurement occasions. The delay unit comprises a plurality of memory cells in a memory for storing the quality values of the communication conditions of the channel for the most recent measurement occasions. A selector operates according to an algorithm for selecting one of the memory cells. The content of the selected cell is used to set the mode of the codec.

31 Claims, 6 Drawing Sheets

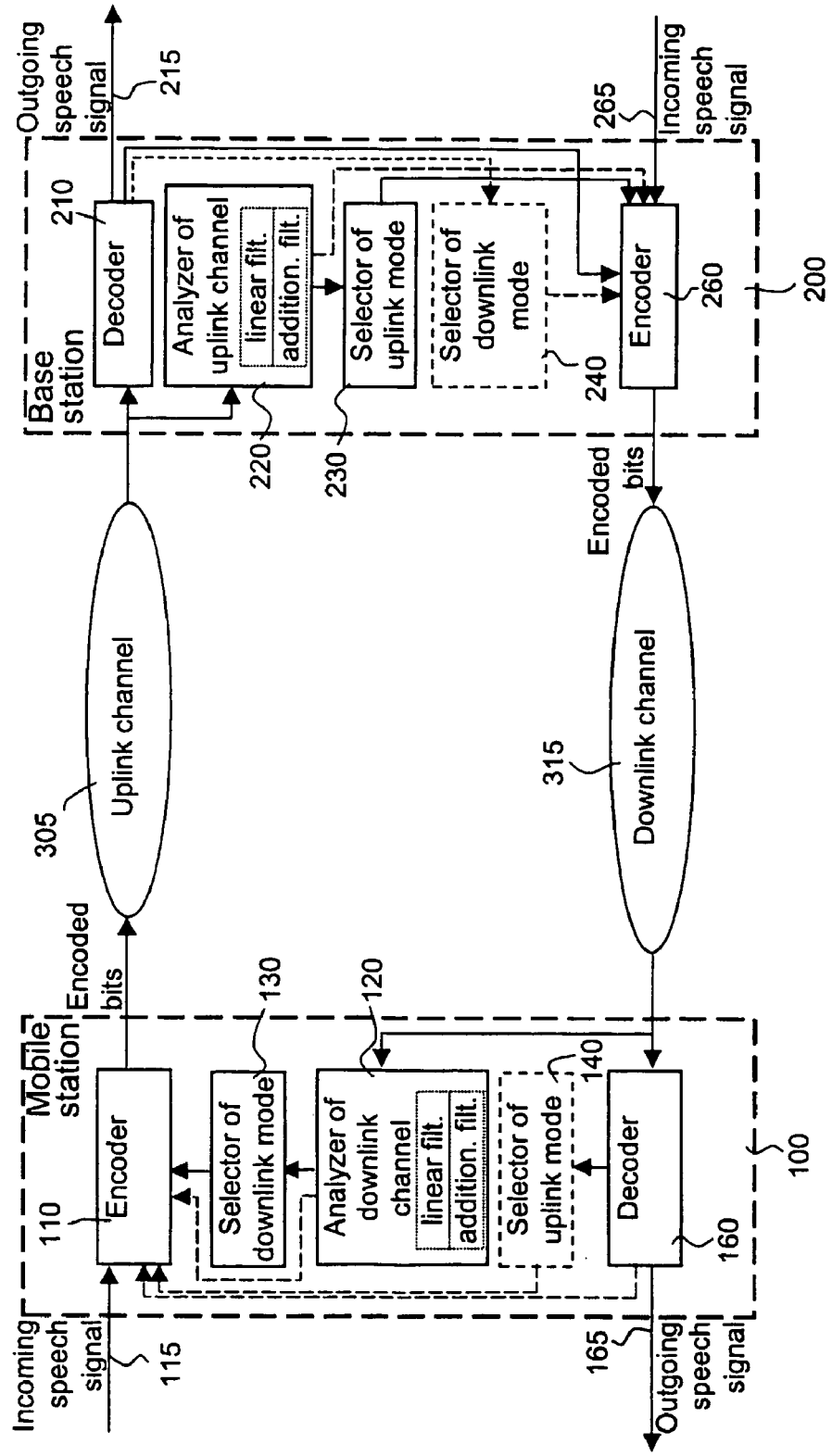

AMR MULTIMODE CODEC FOR CODING SPEECH SIGNALS HAVING DIFFERENT DEGREES FOR ROBUSTNESS

RELATED APPLICATIONS

This application claims priority and benefit from Swedish patent application No. 0102849-7, filed Aug. 22, 2001, the entire teachings of which are incorporated herein by reference.

TECHNICAL FIELD

The present invention relates to adaptation of the modes of a codec used in a digital telecommunication such as a mobile telecommunication system in order to improve the performance of link adaptation and thus the quality of the transmitted speech. More specifically, the invention is related to adaptation of the modes of speech codecs according to the AMR standard.

DESCRIPTION OF RELATED ART

Description of Systems Using AMR

In a cellular radio telecommunication system for digital transmission information is transmitted between central stations and user stations. The total bit rate used in the transmissions from a user station to a central station is in present advanced telephony systems for transmission of speech information determined by the methods used for speech coding, channel coding and modulation, and for a system based on TDMA (Time Division Multiple Access) such as GSM, also by the number of assignable time slots per call specified in the Air Interface Standard. The total, or gross, bit rate comprises the source, or net, bit rate for transmission of speech and the added bit rate derived from the redundant at least one bit per time slot used for channel error protection. In present cellular systems, the ratio of the net bit rate and the extra bit rate originating from redundant bits is fixed.

There has generally been assumed that channels available for transmission of speech have some more or less constant average quality. However, this is not always the case. Therefore, in existing systems, on one hand, when transmitting at a relatively high data rate, the transmission can suffer from an insufficient channel error protection. On the other hand, when transmitting in other cases, the transmission cannot be performed at an optimal data rate, due to a too strong error protection. A better or higher protection of a channel used transmission from faulty transmitted information, i.e. a better channel quality, results in fewer bits being available for the transmission of the original or source information, such as speech.

A method called Unequal Error Protection is used in most standards for cellular telecommunication systems. In Unequal Error Protection, bits comprising speech information are divided into classes of decreasing perceptual importance and each class is encoded using an appropriate rate of protection. Although the Unequal Error Protection method used in most standards to some extent mitigates the flaw of using a method wherein a constant average value of the channel quality is assumed, this is not the best possible solution.

The new Adaptive Multi-Rate (AMR) standard for the GSM system overcomes the problem described above by being adaptive both with respect to the net or source bit rate, i.e. the bit rate of the source information, and with respect to the total or channel bit rate.

Adapting the coding rate of the source information is called codec mode adaptation and allows adapting the degree of error protection. At a given fixed total bit rate, according to this method both the amount of bits used for transmitting the source information and the amount of redundancy bits that are added for protecting the channel from faulty transmitted bits are varied.

Adapting the gross or total bit rate is called mode adaptation herein. In a mobile telecommunication system working according to the GSM standard two channel modes exist, the FR and the HR modes having total bit rates of 22.8 and 11.4 kbps respectively.

The speech codec built according to the AMR specification is provided with a number of codec modes having different bit rates, selected among the available source bit rates: 4.75; 5.15; 5.9; 6.7; 7.4; 7.95; 10.2; 12.2 kbps. The amount of speech coding in relation to the amount of channel coding can be flexibly modified according to the requirements set by the current channel conditions. Thus, in adapting the codec mode according to the AMR specification the present channel conditions are measured and the information obtained thereby is used to select the codec mode that provides the optimum quality for the measured conditions. Ideally, this allows achieving a speech quality curve of the codec built according to the AMR specification that corresponds to the envelope of the quality curves of the individual codec modes. FIG. 3 is a principle diagram of speech quality as a function of the channel quality for an exemplary speech codec built according to the AMR specification having three modes. In this example, mode No. 3 has the highest source bit rate and thus the highest speech quality under error-free conditions. Modes Nos. 2 and 1 have lower source bit rates and provide correspondingly non-optimal transmission under error-free conditions. However, due to its relatively low error protection, codec mode No. 3 is sensitive to transmission errors and the transmission in this mode deteriorates for channel conditions for which transmission in mode No. 2 and, particularly, in mode No. 1 still exhibits robust operation. Transmission in codec mode 1 is most robust and can still operate under channel conditions in which transmission in the other modes has already deteriorated.

Even if the speech codecs and the methods according to the AMR specification were developed in order to improve the transmission of speech in the GSM system, due to its flexibility, the speech codecs and the methods according to the AMR specification are also very suitable for use in other systems. The speech codecs built according to the AMR specification are used for the default speech service in UMTS/IMT-2000 systems and are also very appropriate for voice-over-Internet applications. In all systems, depending on the current network load, a speech codec mode of a higher or lower rate may be selected.

AMR Adaptation

The principle of codec mode adaptation according to the AMR specification will now be described. The source is an incoming electrical signal representing speech information. The incoming speech signal is channel encoded for the selected channel, using the currently selected codec mode and channel mode. The total resulting bits including bits representing the speech information, bits for protection and bits for information regarding the selected mode, i.e. data for adapting the codec mode, are together transmitted over the air interface. Data for adapting the codec mode consist either of channel measurement data, i.e. data indicating the estimated channel quality/capacity or a codec mode request informing the sending side about the codec mode that the sending side should select. Here, the sending side is defined as the encoder at the mobile station or the encoder at the base station. The receiving side is defined as the decoder at the mobile station or the decoder at the base station for the respective transmission case. A decoder receiving a signal detects from the received signal the codec mode used in the transmission and applies the decoding method of the detected codec mode to the received information representing speech. The received data for adapting the codec mode, including information on the measured channel conditions or a codec mode request, is used for selecting the codec mode for the next signal transmitted from the encoder at the receiving side. Moreover, the decoder at the receiving side also makes measurements on the received signal, which result in new channel measurement data, i.e. data representing the current channel conditions in receiving.

Channel measurement data can—after suitable quantization—be directly transmitted to the sending side or it can first be fed into an adapter, i.e. a selector of the codec mode of the incoming channel. The adapter generates a codec mode request or a command in response to the measurement data, which is an indication of the codec mode to be used by the sending side. When this adapter is located on the receiving side, the corresponding codec mode request/command is sent to the sending side instead of the original measurement data. However, when the adapter is located at the sending side, signals representing the measurement data have to be transmitted to sending side. A binding codec mode request is usually referred to as a "codec mode command" whereas if it is merely an indication of the preferred mode and the sending side has the authority to override it, it is referred to as a "codec mode request". This distinction is of minor relevance herein. In the following the acronym CMR will be used for both "codec mode command" and "codec mode request".

CMRs are generated by the adapter based on a measurement of the channel quality. A mapping operation of the measured data to the CMRs is performed. The mapping operation may involve the comparison of the measurement values to predetermined threshold levels. Usually a hysteresis is implemented in this mapping, i.e. different threshold levels are used depending on if—with respect to the previous CMR—a CMR corresponding to a more robust or a less robust mode is to be generated.

A measurement value of the channel quality can be calculated from measurements, e.g. burst-wise measurements of the signal-to-interference ratio (C/I), in the case of a radio channel, or estimates of the total bit error rate. The calculation usually involves filtering instantaneous measurement values by a filter having a memory since measurements taken from only one burst or one frame fluctuate too strongly. In a GSM system, a burst of data is transmitted approximately every fifth millisecond. A frame is a unit within which speech and channel coding is performed. The purpose of filtering is to generate a measurement value that deviates less from the true value than the measurements of a single burst or frame, respectively. Typical filters are linear smoothing and prediction filters. Examples of such filters are given in the GSM publication "GSM 05.09: Link Adaptation".

The performance of link adaptation according to the AMR specification is manifested by the capability of the system to adapt the used codec mode to the present channel condition. That is, a system having optimal performance when applying link adaptation according to the AMR specification will always use a codec mode that gives the best possible signal quality at the present channel condition, whereas situations in which an unsuitable mode is selected do not occur. Unfortunately, this ideal state cannot be reached by practical systems. However, it is crucial to avoid situations in which modes not providing sufficient channel error protection for the present channel condition are selected. Such situations cause extreme signal quality degradation resulting in a total deterioration of the channel error protection. The selection of a mode that is too robust is not so critical as it does not result in a drastic quality drop. This can be tolerated at least for limited periods of time.

A system parameter in a system using the AMR specification being crucial for the performance of link adaptation according to the AMR specification is the AMR loop delay. The AMR loop delay is the time required to transmit a new codec mode command until a signal, encoded in the new codec mode, is received at the decoder end of the channel. The AMR loop delay consists of several components:

Delay at the measurement filter.
Delay due to transmission of the measurement signals or CMR back to the source coding device.
Delay due to source coding.
Delay due to channel coding and the scrambling of the channel encoded bits in their time position.
Delay due to the time it takes to perform signal processing
Delay due to buffering and frame alignment.

The total loop delay in systems designed according to the AMR specification varies from system to system and depends on several factors such as:

1. the type of link between the encoder at the sending side and the decoder at the receiving side, e.g. radio or wire.
2. the type of connection between the channel codec in the base station and the speech codec (TRAU, Transcoding and Rate Adaptation Unit) in the BSC or MSC, e.g. wire, microwave, satellite channel.
3. the type of connection from one end to the other end, e.g. MS (mobile station) to PSTN (Public Switched Telephone Network), or MS to MS using tandem encoding or tandem-free-operation. Tandem-free-operation (TFO) is a transmission mode used for the speech codec data, in which no speech coding using AMR is employed at the base station or a mobile switching center (MSC) or Radio Network Controller (RNC). Hence, the bits coding speech generated by the speech encoder of the first end of a communication channel are directly propagated to the other end of the channel that performs the decoding. TFO can be used in MS to MS connections but also e.g. in connections to or from a codec using AMR of an IP client. Connections with TFO have a relatively high AMR loop delay. MS to MS connections with TFO have two communication channels so that when applying AMR codec mode adaptation a codec mode suitable for both communication channels must be selected.
4. whether the channel is an uplink or downlink,
5. whether discontinuous transmission is used or not,
6. the switching method of the connection, i.e. whether it is circuit-switched or packet-switched (Internet Protocol, Asynchronous Transfer Mode).

Depending on these factors the AMR loop delay may vary from about 100 ms up to more than 500 ms.

Concepts of Systems According to the AMR Specification

Different kinds of AMR-system are conceivable, e.g. those having distributed, centralized and mixed control of codec mode adaptation. Systems having distributed control are symmetric between base station and mobile station. Each receiving side, the decoder at the mobile station and the decoder at the base station, performs quality measurements on the transmission in the incoming channel and sends link adaptation commands or measurement data to the transmitting side.

In systems having centralized control, the adaptation control of both the uplink and the downlink resides at the base station. The mobile station merely assists the network in the adaptation of the downlink by conveying channel quality measurements to the network. There the CMR for the downlink is generated and it is binding. There is no difference of the uplink adaptation between systems having distributed and centralized control.

Mixed control is a combination of centralized and distributed control concepts. It is specified in the AMR specification for the GSM system. A system having mixed control has distributed control as described but the base station can override the CMR from the mobile station with which the base station communicates.

Problem

If the physical conditions of the transmission in a channel vary slowly compared to the AMR loop delay, then good performance of AMR link adaptation can be easily achieved if, when performing an AMR link adaptation, the mode being most appropriate for the presently measured channel condition is selected. If, on the other hand, there are very fast fluctuations of the channel conditions, it is possible to apply a suitably designed low pass filter. Such a filter can be capable of removing the fast fluctuations from the measurements. Thus, the filter generates a measurement value corresponding to the mean value of the fluctuations.

The link adaptation according to the AMR specification described in the GSM specification GSM 05.09 "Link Adaptation" follows this principle. It applies linear low-pass filtering to burst-wise generated C/I estimates. No severe problems have been observed when using this kind of adaptation. However, so far, only system configurations having low AMR loop delays have been considered.

However, if the AMR loop delay is as high as, e.g. 500 ms which may be the case for TFO connections, or in networks having satellite links between BTS (Base Transceiver Station) and TRAU (Transcoding and Rate Adaptation Unit), the use of the existing adaptation method according to the AMR specification may result in problems. So-called out of phase channel conditions may occur, which are caused by the delay between a first event involving a changed channel condition and a second event involving the start of using a codec mode suitable for the altered channel condition. Specifically, link adaptation according to the AMR specification may require a certain mode based on the present channel condition, but due to the AMR loop delay, when that mode starts to be applied, the channel conditions may have changed drastically. Hence, the chosen mode is no longer optimal for the actual channel condition, i.e. an out of phase condition has occurred. This is particularly a problem if a less robust mode than the one currently used has been requested, and when the mode is finally applied, the quality of the currently used channel has deteriorated. This is likely to cause frame erasures and an increased bit error rate and ultimately results in a bad quality of the reconstructed speech signal.

The problem is exemplified by the case where the channel conditions vary periodically with a period of about twice the AMR loop delay. At this critical fluctuation rate of the channel condition, the adaptation will be maximally out of phase. A robust mode is used when the channel is good and a less robust mode is used when the channel is bad. In FIGS. 2a and 2b, the problem is illustrated by an artificial channel profile, which was generated using a channel simulator having a predetermined average value of the channel quality. The channel quality follows a swept sinus curve, i.e. a sine wave having an increasingly higher frequency. The codec mode is out of phase with the actual channel condition at a certain channel fluctuation frequency, as can be seen in the figures. It can be seen that inappropriate codec modes are selected and that a high number of frame erasures (fe) occur. The lower curves in FIGS. 2a and 2b show the varying channel quality having an average carrier-to-noise (C/N) ratio between 3 dB and 15 dB. The upper curves show the selected codec mode, which in this example can be the 12.2, 7.95 or 5.9 kbps mode. Frame erasures (fe) are indicated by the sign "x". The total number of frame erasures is in this example 31.

The problem described above has not previously been encountered or discussed since no situations with high AMR loop delays have been assumed. Thus, it was possible to apply low-pass filtering of the channel measurements, according to the GSM specification GSM 05.09. This filter has a cut-off frequency below the critical channel fluctuation rate at which frequency the adaptation becomes out of phase. Thus, this filter attenuates at the critical fluctuation rate. Therefore, the filter removes fluctuations, at least to a large extent. This means that the filter evens the fluctuations and generates an output value corresponding to the mean value of the incoming fluctuations. Such a filtered measurement value is more suitable for AMR link adaptation.

For high AMR loop delays, a similar method might appear obvious. A low pass filter would be required having a cut-off frequency below a the rate corresponding to (½*AMR loop delay). Requiring the filter to have such a cut-off frequency obviously introduces an additional filter delay, which increases the total AMR loop delay even more and consequently does not solve the problem. This is a consequence of the uncertainty principle, which is a fundamental physical law, causing the filter delay to be inversely proportional to the filter bandwidth.

Prior Art

In the published European patent application No. 0 964 540 for Krinasamy Anandakumar et al. and assigned to Texas Instrument Inc., a system is disclosed for dynamic adaptation of data channel coding in wireless communication between a mobile station and a base station. A frame transmitted from the mobile station includes a convolutionally coded portion containing a downlink measurement bit and a repetition code identifying the codec mode of the frame. A frame transmitted from the base station includes a codec mode command for the mobile station in the convolutionally encoded portion, and a repetition code identifying the codec mode of the downlink frame. The base station includes means for analyzing the quality of the uplink frame and means for determining the quality of downlink from the received downlink measurement. The system is designed as one possible implementation of an AMR-system for GSM. The deficiency of the system and method disclosed in this European patent application is that it does not consider a situation with a high AMR loop delay.

In U.S. Pat. No. 5,701,294 for Ward et al. and assigned to Texas Instruments Inc., a system and a method are disclosed for flexible coding in a radio communication network. The system continuously monitors radio channel quality in both uplink and downlink transmission, and dynamically adapts the combination of speech coding, channel coding, modulation, and the amount of assignable time slots per call to optimize the quality of the transmitted signal at the current channel conditions. Various combinations of the speech coding, channel coding, modulation, and assignable time slots are identified as combination types and corresponding cost functions are defined. However, the system and method proposed in this U.S. patent are not adapted to the new GSM AMR systems as specified by ETSI. Furthermore, the problems related to a high AMR loop delay are not discussed.

The article by Erdal Paksoy et al., "An Adaptive Multi-Rate Speech Coder for Digital Cellular Telephony", 1999 IEEE International Conference on Acoustics, Speech, and Signal Processing, Proceedings, 1999, Vol. 1, pp. 193-196, discloses an adaptive multi-rate (AMR) speech coder designed for digital full rate (22.8 kb/s) and half rate (11.4 kb/s) channels according to the GSM specifications used to maintain a high quality in the presence of highly varying background noise and channel conditions. The decoders monitor channel quality at both ends of the wireless link using the soft values for the received bits and assist the base station in selecting the codec mode appropriate for a given channel condition. The adaptation algorithm used for the channel measurement comprises estimating the carrier to interference ratio (C/I). This estimate is based on the soft values, i.e. values comprising reliability information, for the received bits as provided by the demodulator/equalizer. These values are good indicators of the reliability of the bits. The IEEE article states that a moving average of the absolute values of the soft bits is a good estimator of the current signal-to-interference ratio of the channel. Codec mode decisions are made by comparing the moving average to a predetermined threshold, and by using additional hysteresis rules designed to ensure smoother transitions when changing to a new codec mode. Because of their different characteristics, the full rate and half rate channels require the various parameters of the adaptation mechanism to be tuned separately. However, the problems related to a high AMR loop delay are not discussed. In particular, in this article, filtering using a moving average is suggested, which is a kind of linear low pass filtering. As outlined in the problem discussion above, conventional low pass filtering provides no solution to the problem.

In the published European patent application No. 0 986 206 for Patrick Charriere and assigned to Alcatel a method of changing the encoding level of digital data transmitted between a transmitter and a receiver at a constant rate is disclosed. The encoding level is determined as a function of the signal received by a receiver. The change of the encoding level to a less robust one is delayed by fixed time in order to ensure that the encoding level chosen will not result in too many lost frames.

SUMMARY

It is an object of the invention to provide a method for efficient adaptive mode selecting.

It is another object of the invention to provide a digital communication system for efficient adaptive mode selecting and a delay unit for a digital communication system.

The main problem associated with existing adaptive multi rate systems is that due to a delay between the measurement operation and the adaptation operation, especially when the delay is high, the adaptation is performed at an unsuitable time.

The solution to the problem described above is to apply a suitably selected filtering operation in order to organize the values to be filtered one after the other. At each time instant, the sample values in the memory are arranged in an order according to some algorithm and one sample having a pre-defined time index is output. A filter performing this kind of filtering on channel measurements may be located prior to an adapter. However, said filtering operation may also be applied to CMRs being the output of an adaptation device. As an example, the filter delays CMRs indicating or requesting a less robust codec mode, whereas CMRs for a more robust codec mode are propagated without any delay. As a consequence, a more cautious behavior of AMR adaptation is achieved. Switching to a less robust and thus more risky mode is performed only after a delay, when there is an increased likelihood that the channel conditions remain good.

It is an object of the invention to provide a method for codec mode adaptation in which selection of such codec modes is avoided, which are not sufficiently robust to allow a secure transmission for the current channel condition.

An advantage resulting from using such method is that in the transmission there will be a decreased number of frame erasures and an increase of the overall speech quality when finally played to a listener. AMR systems using the proposed method will generally be more robust.

The proposed method generally results in a more optimized selection of codec mode. If the channel is really improving, a less robust mode having a higher intrinsic quality is selected only after a delay. This may reduce the quality of the received speech signal to some extent. However, the potential quality loss is clearly compensated by the fact that the method as disclosed herein provides a way of minimizing the out of phase problems due to AMR loop delay. It should be observed that the degradation of the speech quality could be significant if a not sufficiently robust mode is used, whereas the speech quality degradation caused by keeping a codec mode being more robust than necessary for a too long time is very moderate.

The term "comprises/comprising" when used in this specification is taken to specify the presence of stated features, integers, steps or components but does not preclude the presence or addition of one or more other features, integers, steps, components or groups thereof.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

FIG. 1 is a block diagram illustrating a telecommunication system in which the AMR coding scheme is used when the signal is out of phase, in non-tandem free operation.

DETAILED DESCRIPTION

Figure 2A:
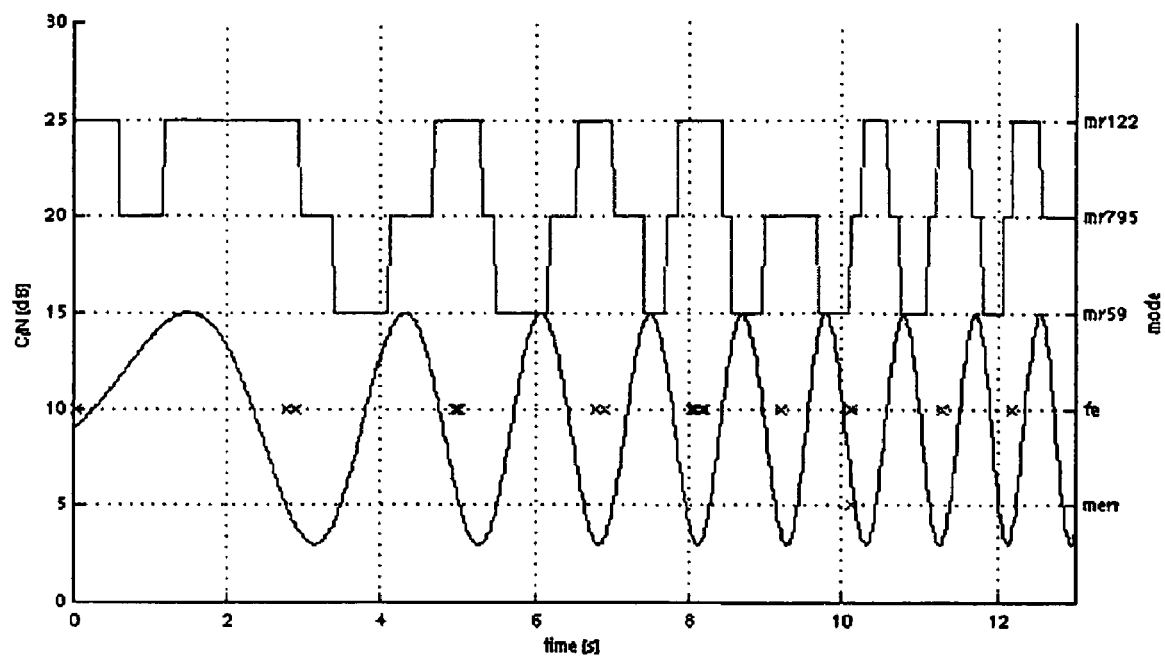
FIGS. 2a and 2b are diagrams illustrating codec mode decision in present AMR systems.
Figure 2B:
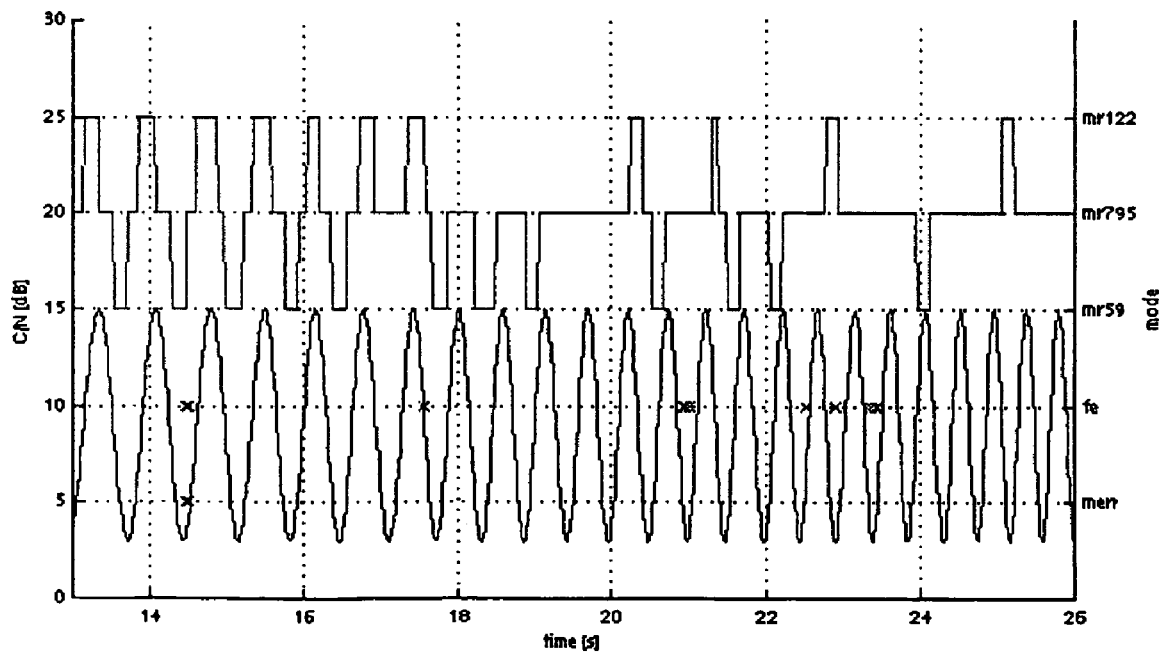
Figure 3:
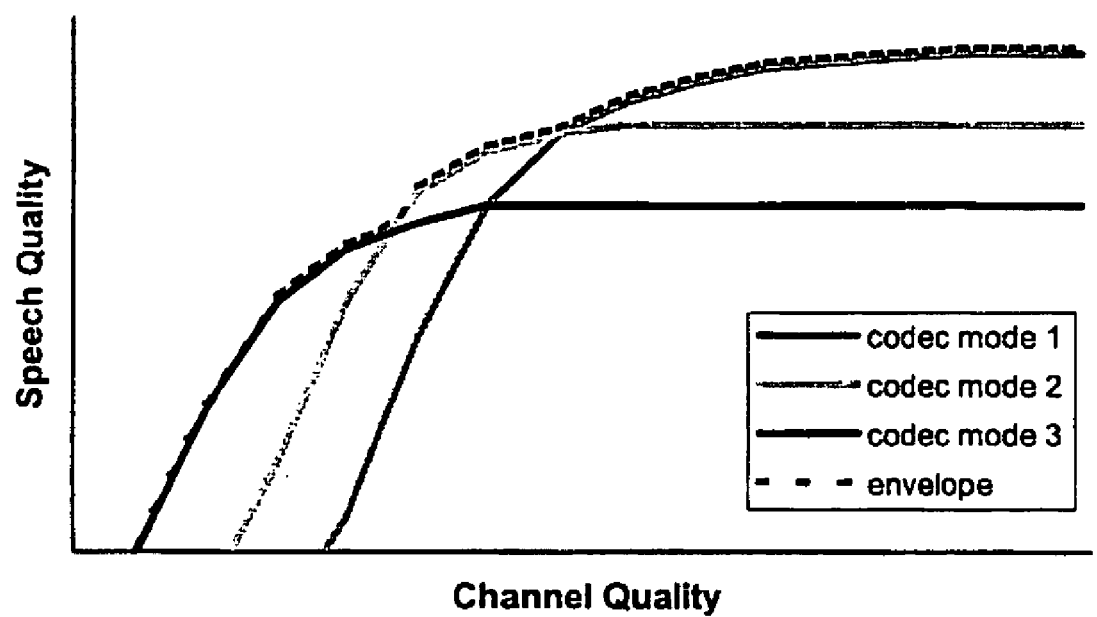
FIG. 3 is a diagram illustrating the principle of AMR codec mode adaptation.

A telecommunication system will be described operating at least in part in a radio or wireless communication environment. However, the methods and devices to be described hereinafter can be used in any digital network, using radio and/or wired connections and using some kind of encoding of digital voice or speech information, the not encoded or decoded voice or speech information directly representing acoustic signals in the conventional way, as recorded by a microphone.

The block diagram of FIG. 1 illustrates a mobile, wireless telecommunication system comprising a base station 200 and a mobile station 100 communicating with each other on an uplink channel 305 and a downlink channel 315. In both the base station and the mobile station AMR coding schemes are used. The mobile station 100 comprises a speech/channel encoder 110 that can adopt different modes of coding or different coding schemes having different degrees of robustness, an analyzer 120 for sensing and analyzing the condition of the downlink channel, a selector 130 of downlink mode, and a speech/channel decoder 160. The base station 200 comprises a speech/channel encoder 260 that like the encoder 110 of the mobile station can adopt different modes of coding or different coding schemes having different degrees of robustness, an analyzer 220 for sensing and analyzing the condition of the uplink channel, a selector 230 of uplink mode, and a speech/channel decoder 210. The base station may also comprise a selector 240 of downlink mode, either instead of or in addition to the selector 130 in the mobile station. In the latter case the selector 240 of downlink mode has the authority to override CMRs generated by the selector 130 of downlink mode located in the mobile station. The mobile station 100 may also comprise a selector 140 of uplink mode. The mobile station transmits on the uplink channel 305 information which has been encoded by its encoder 110 and which is decoded by the decoder 210. The base station 200 transmits information on the downlink channel 315 which has been encoded by its encoder 260 and which is decoded by the decoder 160. It should be noted that the speech decoder 210 and the speech encoder 260 in the base station do not have to be physical parts of or physically located in the base station. The encoder and the decoder can be located in an MSC, not shown, connected to the base station 200.

In operation, when communicating information representing speech, the decoder 160 in the mobile station 100 receives a signal transmitted on the downlink channel 315 from the base station 200. Then, the decoder 160 decodes the received signal to produce speech signals, see the arrow 165, that are made audible to the user, not shown, of the mobile station. Furthermore, the decoder 160 also decodes or detects, in the received signal, codec mode information derived from and/or indicating/comprising the measured quality or condition of the uplink channel 305. This information can be or include a codec mode command or request for uplink transmission that is then fed to the encoder 110 in the mobile station to set the encoder to work in the mode indicated in the command. In the case where the information does not directly indicate a codec mode the codec mode information is fed to the optional selector 140 in the mobile station, in which a new mode for uplink transmission is determined or selected. Then, the result from the selector 140 is fed to the encoder 110 to set it to work in the mode indicated in the result so that this mode is used in the next uplink transmission. Incoming speech signals, see the arrow 115, from the user of the mobile station are speech and channel encoded in the encoder 110 of the mobile station according to the selected or set codec mode. Thereafter, encoded speech is transmitted via the uplink channel 305 to the base station 200.

Simultaneously, the signal received in the mobile station 100 from the base station 200 is fed to the analyzer 120 in the mobile station in which the signal is sensed and analyzed to determine the communication condition or the quality of the communication on the downlink channel 315. Then, the result of the analysis is fed to the selector 130 of downlink mode in the mobile station in which, based on the result of the analysis, a codec mode command or request for downlink transmission is generated. A man skilled in the art understands that very often the codec mode used for downlink transmission has to be changed depending on the channel state. Then, the generated codec mode command or request is fed to the encoder 110, which encodes the codec mode request to be transmitted to the base station 200. In the case where selector 130 is provided in the mobile station, the result of the analysis in the analyzer 120 is fed directly to the encoder 110.

The decoder 210 of the base station 200 receives a signal from the mobile station 110 on the uplink channel 305. The decoder decodes the received signal and transforms the relevant part of it to speech signals, see the arrow 215, which are transmitted to the party with which the user of the mobile station is talking. Furthermore, the received signal is also fed to the analyzer 220 of the base station in which the signal is analyzed to determine the quality of the communication on the uplink channel 305. Then, the result from the analyzer 220 is fed to the selector 230 connected to or in the base station in which a codec mode is selected to be used for uplink transmission. The result from the selector 230 is fed to the encoder 260 of the base station to be transmitted to the mobile station 100 on the downlink channel 315. Alternatively, the result from the analyzer 220 of the uplink channel is fed directly to the encoder 260 to be transmitted to the mobile station 100.

Furthermore, the decoder 210 in the base station 200 decodes or detects in the received signal codec mode adaptation data such as a codec mode request for the downlink channel or, alternatively, data representing the analyzed condition of the communication on the downlink channel. In the case where the data comprises a codec mode command it is fed directly to the encoder 260 to set the encoding mode thereof, the encoder encoding speech incoming from the other party of the conversation, see the arrow 265. In the alternative case, the decoded or detected data from the decoder 210, these data comprising either a codec mode request or measurement data, are provided to the optional selector 240 in which a codec mode is selected. Thereafter, the result comprising the selected mode is fed to the encoder 260 to set it to work in that mode.

Thus generally, codec mode adaptation requires the transmission of adaptation data for the considered transmission channel or link. On the uplink channel 305, adaptation data for adapting the downlink communication are transmitted. On the downlink channel 315, adaptation data for adapting communication on the uplink are transmitted. The adaptation data comprises CMRs or channel measurement data, the latter being values obtained or derived in the analysis performed by the analyzers 120 and 220 respectively of the received signal and representing the communication condition of the respective channel.

Now, the adaptation for uplink transmission will be described. The base station 200 monitors the condition of the uplink channel 305 and decides the codec mode that the mobile station 100 should use. Therefore, the analyzer 220 analyzes the signal received from the uplink channel thereby determining or measuring the quality of the communication in the channel. The result of the analysis is sent from the analyzer 220 to the selector 230 of uplink mode in the base station. The selector 230 selects an uplink codec mode suitable for the current condition of the uplink channel. The base station 200 communicates this information as a CMR, transmitted on the downlink channel 315 to the mobile station 100. Upon reception, the encoder 110 in the mobile station switches to the mode indicated in the CMR. In the alternative, the mobile station 100 accommodates an alternative selector 140 of uplink mode, instead of the selector 230 at the base station. In that case values representing the determined condition of the uplink channel are output from the analyzer 220 of the uplink channel and are transmitted via the downlink channel 315 to the alternative selector 140 of uplink mode.

Now, link adaptation for downlink transmission will be described. Based on the signal received from the base station 200 over the downlink channel 315 and possibly other information that may be available, the analyzer 120 in the mobile station 100 determines or measures the condition of the communication in the downlink channel to find the quality of the communication of the channel. The result that is produced by the analyzer and can comprise values representing the determined quality is fed to the selector 130 of downlink mode in the mobile station which generates a CMR based on its input. The generated CMR is transmitted via the uplink channel 305 to the base station 200 in which it is received and can be directly transferred to the encoder 260 for setting the encoding mode. As an alternative, the CMR received in the base station may be fed into the optional additional selector 240 of downlink mode that has authority to override the received CMR. The output of the optional selector 240 of down link mode indicates the selected codec mode to the encoder 260 of the base station. In the case where the mobile station does not accommodate a selector of downlink mode, values or measurement data being the result of the analysis of the communication in the downlink channel and representing the quality of said communication are sent via the uplink channel 305 to the base station 200. There, the received values are fed to the optional or alternative selector 240 of downlink mode.

Figure 7:
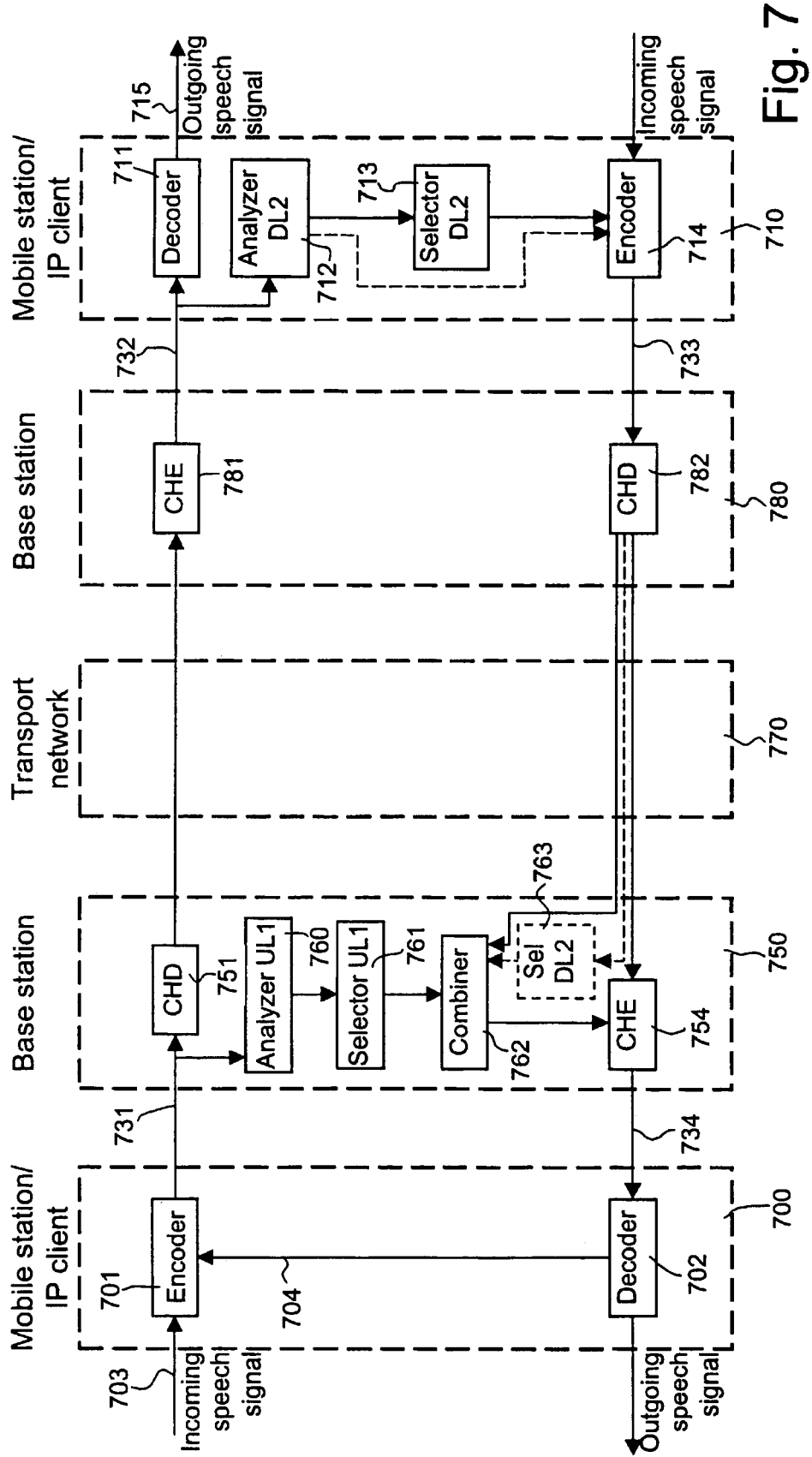
FIG. 7 is a block diagram illustrating a telecommunication system in which tandem free operation is used.

In FIG. 7 a block diagram of a system is shown having established a tandem-free-operation (TFO) connection between a mobile station or an IP client 700 and a mobile station or an IP client 710, respectively, via a first base station 750, a transport network 770 and a second base station 780. As the configuration is symmetric for transmission of information representing speech in both directions, the system will be described only for speech transmission from the mobile station or the IP client 700 to the mobile station 710. An encoder 701 receives a speech signal on a line 703 and encodes it according to its current mode of codec operation, as has been set or indicated by a received control signal on the control line 704, and also makes a channel encoding. The coded speech signal is transmitted via an uplink channel 731 to the first base station 750. A channel decoder 751 in the first base station channel decodes the received data, i.e. the coded speech signal, and forwards the channel decoded data through the transport network 770 to a channel encoder 781 in the second base station 780, in which the data is channel encoded for transmission over a downlink channel 732 to the other mobile station or IP client 710. The first base station 750 further comprises an analyzer 760 of uplink channel that performs measurements on the signals received over uplink channel 731 to determine the condition of the communication in said channel and to find the quality thereof. Values or data representing the result of the analysis of the communication in the uplink channel are provided to a selector 761 of uplink codec mode, also in the first base station 750, which generates preliminary codec mode command data CMR1 that are then fed to a combiner 762 in the first base station.

The mobile station or IP client 710 comprises a channel and speech decoder 711 which decodes coded speech data incoming from the downlink channel 732 and outputs the reconstructed speech signal on an output line 715. The mobile station or IP client 710 further comprises an analyzer 712 that performs measurements on the signals received from the downlink channel 732 to determine the condition of the communication in the channel and the quality of the communication. Then, values or data resulting from the channel analysis and representing the condition or quality of the communication in the downlink channel are fed from the analyzer 712 in the mobile station or IP client 710 to a selector 713 of downlink codec mode, which generates preliminary codec mode command data CMR2. These data CMR2 are channel encoded in an encoder 714 in the mobile station or IP client 710 and are then transmitted, together with information representing speech, via an uplink channel 733 to the second base station 780. There, a channel decoder 782 decodes received signals and finds the CMR2 and provides it via the transport network 770 to the combiner 762 in the first base station 750. Optionally, the CMR2 is forwarded to the combiner 762 via an additional selector 763 of codec mode in the first base station that has the authority to override CMR2 to provide a modified CMR2. The optional selector 763 of codec mode is also used in the case where the selector 713 of codec mode in the mobile station or IP client is not used, and the data representing the quality of the channel is then instead provided from the analyzer 712 of downlink channel in the mobile station or IP client 710 to the optional selector 763 in the first base station 750 via the encoder 714, the uplink channel 733 and the decoder 782. The optional selector then produces the CMR2. The combiner 762 combines the preliminary codec mode commands or requests CMR1 and CMR2 to a final CMR3 that is output from the combiner 762. Then, the final CMR3 is fed to a channel encoder 754 in the first base station 750, in which the CMR3 is channel encoded and is then transmitted over a downlink channel 734 to the first mobile station or IP client 700. There, a channel decoder 702 decodes the signals received on the downlink channel to find inter alia, CMR3 and then provides this command to the encoder 701, to set the codec mode of the encoder. The channel encoder 781 is arranged to use the same codec mode as the encoder 701 for the same transmitted information, the codec mode used being decoded or detected by the decoder 751 in the first base station 750.

Figure 6:
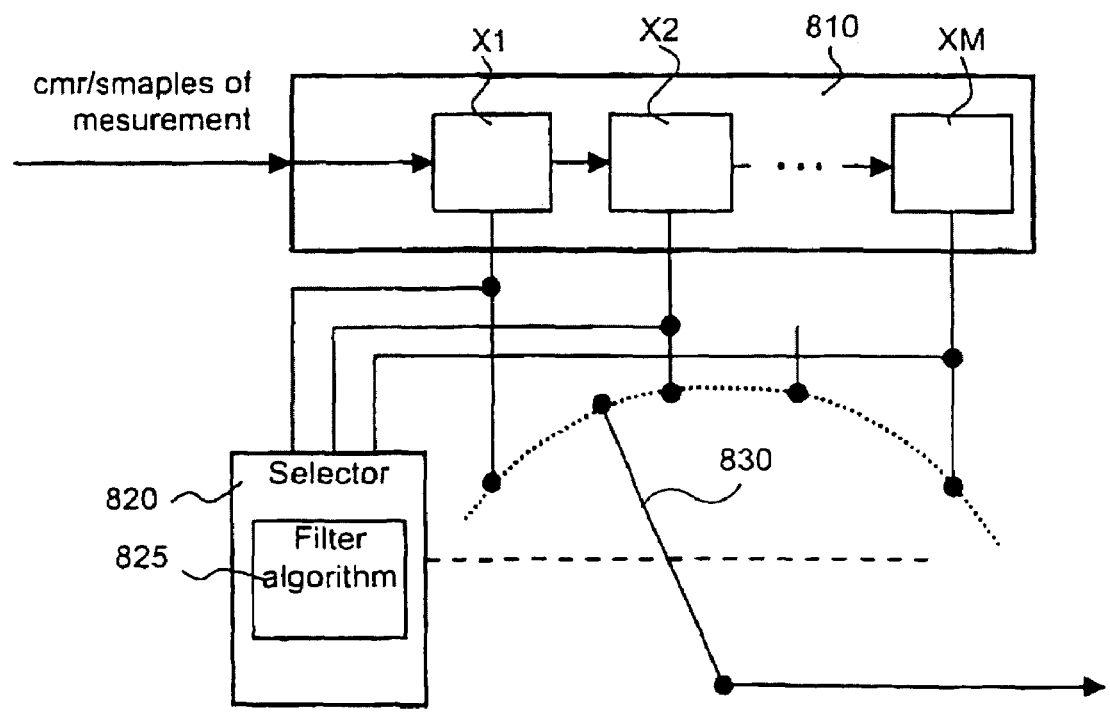
FIG. 6 is a block diagram of a delay unit.

In FIG. 6 a block diagram of a delay unit for codec mode commands or requests, CMRs, is shown. Each time when a CMR is available to set the operative mode of an encoder from a selector of codec mode, as has been described above, it is input to the delay unit. The delay unit generates a CMR on its output as a response to the current input CMR and at least one previously input CMR. The delay unit is provided with a memory 810 in which a number M of the most recent, received CMRs are stored, M being an integer and designating the memory length of the delay unit, a suitable choice being e.g. M=25. A selector 820 is connected to the memory locations $X_1, X_2, \ldots, X_M$ of the memory 810. The selector 820 controls a switch 830. By the switch the content of a selected memory location of the memory 810 is passed to the output of the delay unit. The selector 820 controls the switch 830 according to a filter algorithm 825.

According to a suitable filter algorithm that memory location is selected which contains that CMR among the CMR stored in the memory 810 that is indicative of the most robust codes mode. Such a process can be facilitated by e.g. assigning integer numbers to the codec modes, where the smaller the integer number is, the more robust is the codec mode, e.g. the most robust mode MR475 is assigned the integer value 1, the second most robust mode MR515 is assigned the integer value 2, ..., and the least robust mode MR122 is assigned the integer value 8. Then, the memory location holding a CMR that has the lowest integer number among those associated with the stored CMRs is selected.

The filter algorithm may also search for that CMR among the CMRs stored in the memory 810 which indicates the n-th most robust codec mode, where e.g. n=2. The filter outputs the selected CMR. The advantage of selecting the n-th most codec mode is that a trade-off between quality and the speed of the codec mode adaptation can be performed according to the current channel conditions.

As an alternative to the filter algorithm disclosed above, the filter algorithm calculates and outputs the median of the CMRs stored in the memory 810. In this case the CMRs stored in the memory are sorted with respect to the robustness of the corresponding codec mode and generally the m-th element ($1 \leq m \leq M$, m being an integer) of the sorted CMRs is used as output of the delay unit. For providing the median, the delay unit outputs the middle element for which m=floor ((M+1)/2).

According to another embodiment the filter operation according to the different, alternative algorithms as described in conjunction with FIG. 6 are applied to values representing the current condition or quality of the channel before or after possible linear filtering. Linear filtering is usually part of the analysis devices 220, 120, 760, 712, but the linear filtering may also be part of the selectors 130, 140, 761, 713, 763.

The last example of the filter algorithm performed by the delay unit in FIG. 6 involves the step of first rearranging the order of the data in the cells of the memory 810 to place the stored data in some predetermined way or according to some algorithm and then selecting the data of a predetermined memory cell or memory location as output. Alternatively, this can be interpreted as selecting the value of a memory location $X_i$, the index i being an integer in the range of 1 to M, in the memory 810, the choice of the index i being dependent on the contents of the memory. In the examples discussed above, it is possible to achieve an adaptation behavior, which allows different adaptation speeds depending on whether switching is performed with respect to the present codec mode towards a more robust mode or a less robust mode. In particular this allows immediate switching to more robust modes whereas switching to less robust modes is delayed until it is rather probable that the channel condition remains good enough for that less robust mode, as will be described below.

The method described above is illustrated by the following example. Assume that the memory length of the delay unit is M=5, and that the AMR speech codec operates at two codec modes, MR475 and MR122, the mode MR475 being more robust than mode MR122. The filter algorithm is designed so that the delay unit returns a CMR selected among the CMRs in the memory and corresponding to the most robust mode. First, it is assumed that the channel has a good quality. Thus, all memory locations contain CMRs for mode MR122. The delay unit outputs MR122. A sudden degradation of the channel quality leads to a CMR of the more robust mode MR475 at the input of the delay unit. Then, the memory of the delay unit comprises the mode MR475 in location $X_1$, and the mode MR122 in locations $X_2$, $X_3$, $X_4$, $X_5$. According to the filter algorithm, the delay unit immediately outputs MR475, i.e. the adaptation immediately reacts on channel quality degradations. Now, the opposite case is assumed, i.e. that the communication in the channel is bad. Then, all memory locations comprise CMRs for the mode MR475. A sudden improvement of the channel results in a CMR for mode MR122 at the input of the delay unit. However, the delay unit still generates a CMR for mode MR475 as there are still memory locations in the delay unit comprising the mode MR475. It takes some time before all the five memory locations comprise CMRs for the less robust mode MR122 and thus before operation at the less robust mode MR122 is requested. Hence, the channel must have a good quality for a predefined time period, since a single CMR for a more robust mode in the memory of the delay unit does not trigger any change of mode. Thus, the adaptation to a less robust mode is delayed until it is more certain that the channel has an improved quality.

The delay unit is of major importance in the method that is described herein and the principle of the method cannot be implemented without the delay unit. The length M, i.e. the number of memory locations, of the memory of the delay unit is a design parameter influencing the behavior of the AMR adaptation. According to a preferred embodiment this parameter is selected adaptively with respect to the AMR loop delay. In particular, the memory length M of the delay unit can be proportional to the AMR loop delay. As an example, the length of time corresponding to the memory length M can be equal to the AMR loop delay. For instance, assuming a GSM system, the CMRs are generated at a rate of one every 40 ms. If the AMR loop delay is 480 ms, then the length M is chosen to 480/40=12. If, however, the AMR loop delay is only 200 ms, the memory length M is chosen to be equal to 5.

As an option, additional filtering, i.e. an adaptive delay operation, described herein may only be performed when the AMR loop delay is higher than a threshold d, e.g. the threshold d being equal to 200 ms.

The method described herein can be implemented in various system configurations. According to a preferred embodiment the additional filtering is performed in the analyzers of the respective incoming channel, i.e. the analyzer 120 in the mobile station 100 in FIG. 1 in the case of the downlink channel and the analyzer 220 in the base station 200 for the uplink channel. In this case, the additional filtering is performed using the measurement values and not CMRs.

Figure 5:
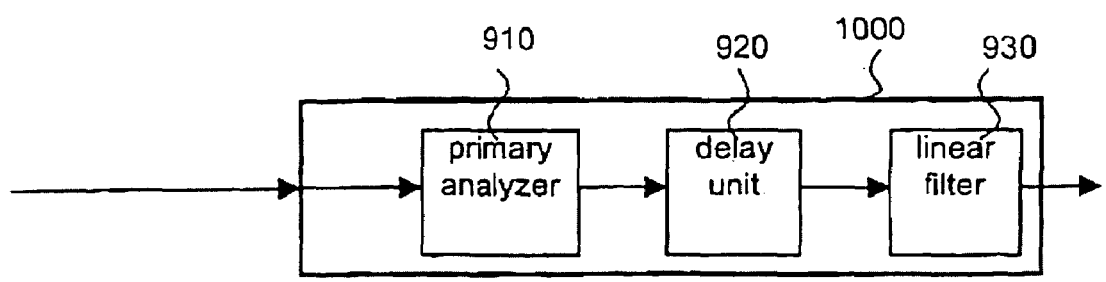
FIG. 5 is a block diagram illustrating an alternative analyzer.

In FIG. 5 the structure of an alternative analyzer 1000 is shown. The analyzer 1000 comprises three functional blocks, a primary analyzer 910, a delay unit 920 and a linear filter 930. First, the incoming signal is transmitted to the primary analyzer 910, which has the same function as the analyzers 120, 220 described above. Then, the signal is transmitted to the delay unit 920, which has the same function as the delay unit described above. Thereafter, the signal is fed to the linear filter 930. Linear filtering of measurement values may be part of the original analyzer 120, 220. In the analyzer 1000, the linear filtering of measurement values is provided after the delay unit 920, in the linear filter 930.

According to another preferred embodiment of the proposed method the additional filtering is performed in the selectors located at the respective receiving ends. For downlink adaptation the additional filtering is then performed in the selector 130, and for uplink adaptation in the selector 230, see FIG. 1.

According to a further preferred embodiment of the method the additional filtering is performed in the selectors located at the respective transmitting ends. For downlink adaptation, this is then performed in the alternative selector 240, and for uplink adaptation the additional filtering is performed in the alternative selector 140, see FIG. 1.

The method described herein can also be advantageously used for TFO connections. The additional filtering may be performed in the mobile station/IP client 710 either as part of the analyzer 712 of the downlink channel or as part of the selector 713 of codec mode for downlink transmission, see FIG. 7.

In a further example, the additional filtering is performed in part both in the additional selector 763 of downlink codec mode and in part either in the analyzer 760 of uplink channel or in the selector 761 of uplink channel, respectively, in the relevant base station, see FIG. 7. Data representing the condition of the communication in the downlink channel is fed to the selector 763 in which additional filtering is performed. It should be noted that for the downlink channel 732 the AMR loop delay is larger than the AMR loop delay for the uplink channel 731, since AMR adaptation for the downlink involves a big control loop starting from the second mobile station/IP client 710 via the uplink 733, the second base station 780, the transport network 770, the first base station 750, the downlink 734, the first mobile station or IP client 700 and back to the second mobile station or IP client 710 via the uplink 731, the first base station 750, the transport network 770, the second base station 780 and the downlink 732. The additional filtering performed in the analyzer 760 or the selector 761 is performed using data representing the state of the uplink channel 731 for which the AMR loop delay is smaller as only a small or short control loop is involved, this loop including the first base station 750, the downlink 734, the first mobile station or IP client 700 and the uplink 731. Thus, it is more advisable to apply different memory lengths M for the different delay units, corresponding to the different AMR loop delays. The combiner 762 selects that CMR3 among CMR1 and CMR2, which corresponds to the most robust codec mode, as the output signal.

Furthermore, in the system of FIG. 7, it is possible to perform the additional filtering after the combiner 762 in the relevant base station or after decoding in the decoder 702 in the mobile station or IP client 700. However, this is less advantageous as it does not provide the benefit of using different memory lengths M for the different effective AMR loop delays.

Figure 4A:
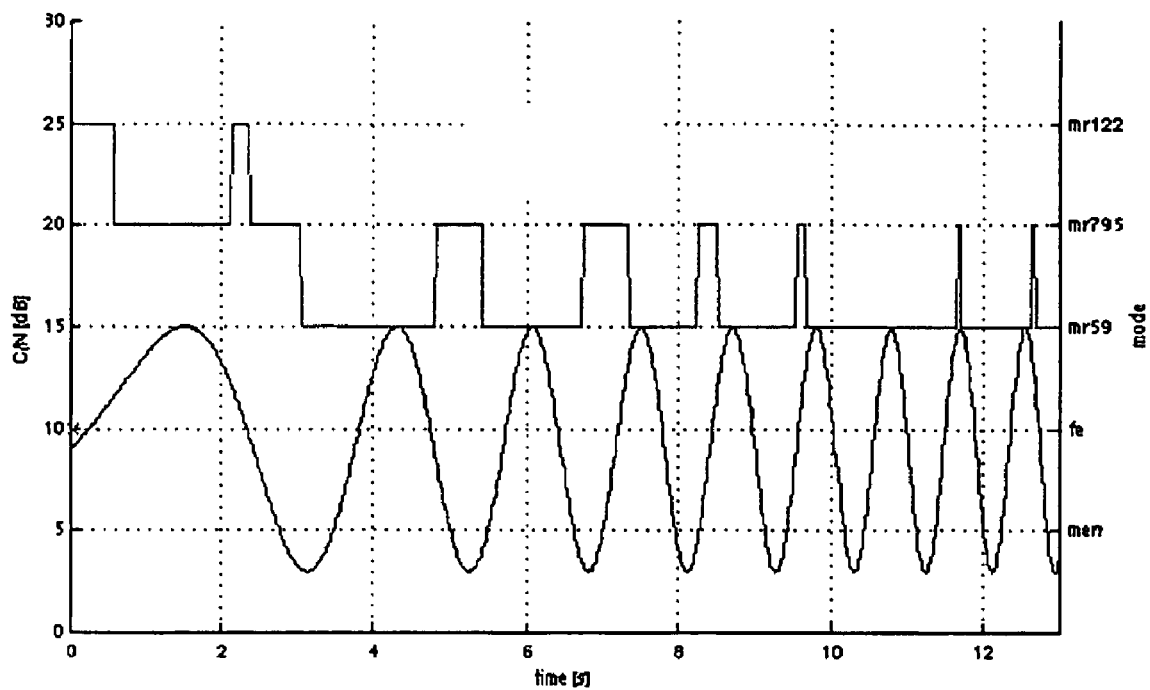
FIGS. 4a and 4b are diagrams illustrating code mode decision for an AMR system having delayed codec mode switching.
Figure 4B:
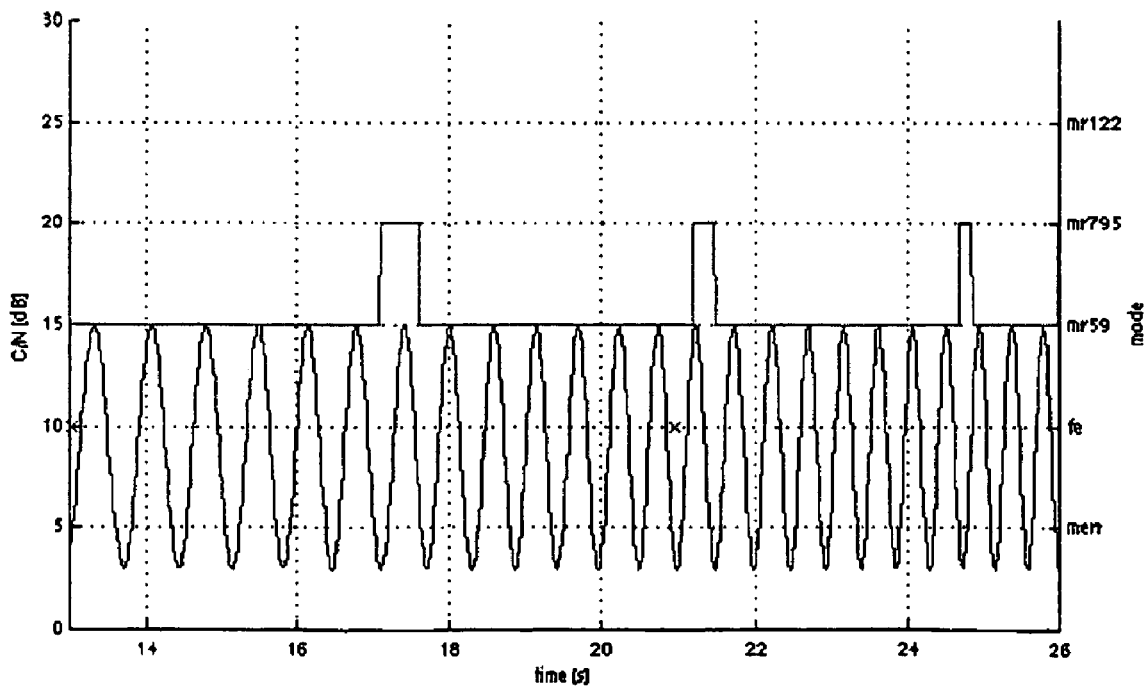

FIGS. 4*a* and 4*b* show channel profiles for the case when the method as described herein is used. The curves in FIGS. 4*a* and 4*b* have been generated using a channel simulator having a predetermined average value of the channel quality. The channel quality follows a swept sinus curve. As is shown in FIGS. 4*a* and 4*b*, out-of-phase conditions between channel quality and selection of codec mode are avoided, when the method described above is used. Codec modes not being sufficiently robust are not selected anymore. The advantage of the method is also visible by comparing the number of frame erasures, which have been reduced from 31 to 3. By using the method described herein the perceived quality of the received signal is significantly improved.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

The invention claimed is:

1. A method of controlling the operation of an Adaptive Multi-Rate encoder for encoding speech signals to be sent between a first node and a second node in a wireless communication system, the encoder being operable to encode the speech signals in at least two modes having different degrees of robustness, the method comprising the steps of:
   sensing a first communication condition in a communication channel between the first and the second node;
   identifying a first mode applicable to said encoder corresponding to the first communication condition in the communication channel;
   storing a value indicative of the first mode in a memory, the length M of which is selected responsive to an Adaptive Multi-Rate loop delay, where M is an integer; and
   comparing the value indicative of the first mode to a plurality of values previously stored in the memory, each of said plurality of values being indicative of one of a set of previous modes corresponding to one of a plurality of previously sensed communication conditions wherein, compared to the plurality of previously stored values, if the value indicative of the first mode indicates that the first communication condition
      is degraded relative to the plurality of previously sensed communication conditions, selecting said first mode as a selected mode to be applied by said encoder; or
      is improved over at least one of the plurality of previously sensed communication conditions, selecting one of said previous modes as the selected mode to be applied by said encoder.

2. The method of claim 1, wherein said values are expressed as Codec Mode Requests (CMRs).

3. The method of claim 1, wherein said values are expressed as Codec Mode Commands.

4. The method of claim 1, further comprising the step of dynamically selecting the length M of said memory with respect to the Adaptive Multi-Rate loop delay.

5. The method of claim 4, wherein the length M of said memory is selected responsive to said Adaptive Multi-Rate loop delay only in the case where the Adaptive Multi-Rate loop delay is higher than a predetermined threshold.

6. The method of claim 1, wherein the length M of said memory is selected so that, when said first mode is less robust than a mode currently employed by said encoder, adaptation to said first mode does not coincide in time with a degraded communication condition of said communication channel, whereby out of phase conditions in mode adaptation are avoided.

7. The method of claim 1, wherein the length M of said memory is selected so that, when said first mode is less robust than a mode currently applied by said encoder, adaptation to said first mode is delayed until communication conditions remain acceptable for the first mode.

8. The method of claim 1, further comprising the step of providing, by said second node, an indication of the selected mode to the first node for adaptation of said encoder.

9. The method of claim 1, the first node being a mobile station and the second node being a base station.

10. The method of claim 1, the first node being a base station and the second node being a mobile station.

11. A delay unit for controlling the operation of a an Adaptive Multi-Rate encoder for encoding speech signals to be sent between a first node and a second node in a wireless communications system, the encoder being operable to encode the speech signals in at least two codec modes having different degrees of robustness, the delay unit comprising:
- an input for receiving signal values representing communication conditions in a communication channel between the first node and the second node;
- a memory for storing the signal values in memory locations, the memory having a length M of memory locations that is selected responsive to an Adaptive Multi-Rate loop delay, M being an integer;
- a selector coupled to the memory locations for comparing a last received signal value to a plurality of previously received signal values that are currently stored in the memory locations, said last received signal value corresponding to a current communication condition and each said plurality of previously received signal values corresponding to one of a plurality of previous communication conditions wherein, as compared to the plurality of previously received signal values, if the last received signal value indicates that the current communication condition
  - is degraded relative to the plurality of previous communication conditions, selecting a memory location containing said last received signal value; or
  - is improved over at least one of the plurality of previous communication conditions, selecting a memory location containing one of said plurality of previously received signal values, the selector making memory selections according to a predetermined filter algorithm; and
- a switch, controlled by said selector, for switching the signal value contained in the selected memory location of the memory to be passed to an output of the delay unit.

12. The delay unit of claim 11 wherein said signal values are channel measurement values.

13. The delay unit of claim 11, wherein said signal values are indicative of codec modes applicable to said encoder.

14. The delay unit of claim 11, wherein the length M of said memory is selected adaptively with respect to the Adaptive Multi-Rate (AMR) loop delay.

15. The method of claim 11, wherein the length M of said memory is selected so that adaptation to a codec mode that is less robust than a codec mode currently applied by said encoder does not coincide in time with a degraded communication condition of said communication channel, whereby out of phase conditions in mode adaptation are avoided.

16. The delay unit of claim 11, wherein the length M of said memory is selected so that adaptation to a codec mode that is less robust than a codec mode currently applied by said encoder is delayed until communication conditions remain acceptable for the less robust codec mode.

17. The delay unit of claim 11,
said memory locations having position numbers indicating their sequential order,
said predetermined filter being operable to sort the signal values stored in said memory locations according to the quality of the communication condition indicated and
said selector being operable to select the memory location having position number m smaller than or equal to said memory length M containing one of said plurality of previously received signal values.

18. The delay unit of claim 11,
said predetermined filter being operable to search among the signal values stored in said memory locations for a signal value that represents a worst communication condition or an n-th worst communication condition, and
said selector being operable to select the memory location for the signal value that represents the worst communication condition or the n-th worst communication condition as said memory location containing one of said plurality of previously received signal values.

19. The delay unit of claim 11,
said predetermined filter being operable to determine a median of the signal values stored in said memory locations, and
said selector being operable to select the memory location containing the median of the signal value as said memory location containing one of said plurality of previously received signal values.

20. A method of controlling the operation of an Adaptive Multi-Rate encoder for encoding speech signals to be sent between a first node and a second node in a wireless communication system, the encoder being operable to encode the speech signals in at least two modes having different degrees of robustness, the method comprising the steps of:
- sensing a first communication condition in a communication channel between the first and the second node;
- generating a first channel measurement value corresponding to the first communication condition in the communication channel;
- storing the first channel measurement value in a memory, the length M of which is selected responsive to an Adaptive Multi-Rate loop delay, where M is an integer; and
- comparing the first channel measurement to a plurality of channel measurement values previously stored in the memory, each of said plurality of channel measurement values corresponding to one of a plurality of previously sensed communication conditions wherein, compared to the plurality of previously stored channel measurement values, if the first channel measurement value indicates that the first communication condition
  - is degraded relative to the plurality of previously sensed communication conditions, selecting a first mode associated with the first channel measurement value;
  - is improved over at least one of the plurality of previously sensed communication conditions, selecting a second mode associated with one of said plurality of channel measurement values previously stored in said memory.

21. The method of claim 20, further comprising the step of dynamically selecting the length M of said memory with respect to the Adaptive Multi-Rate loop delay.

22. The method of claim 21, wherein the length M of said memory is selected responsive to said Adaptive Multi-Rate loop delay only in the case where the Adaptive Multi-Rate loop delay is higher than a predetermined threshold.

23. The method of claim 20, wherein the length M of said memory is selected so that, when said first mode is less robust than a mode currently employed by said encoder, adaptation to said first mode does not coincide in time with a degraded communication condition of said communication channel, whereby out of phase conditions in mode adaptation are avoided.

24. The method of claim 20, wherein the length M of said memory is selected so that, when said first mode is less robust than a mode currently employed by said encoder, adaptation to said first mode is delayed until communication conditions remain acceptable for the first mode.

25. The method of claim 20, further comprising the step of providing, by said second node, an indication of either the first or the second mode to the first node for adaptation of said encoder.

26. The method of claim 20, the first node being a mobile station and the second node being a base station.

27. The method of claim 20, the first node being a base station and the second node being a mobile station.

28. A method of controlling the operation of an Adaptive Multi-Rate encoder for encoding speech signals to be sent using Tandem Free Operation over a first communication channel and a second communication channel that are connected in series via a transport network between a first node and a second node in a wireless communication system, the encoder being operable to encode the speech signals in at least two modes having different degrees of robustness, the method comprising the steps of:

sensing a first communication condition in the first communication channel between the first node and the transport network;

identifying a first mode applicable to said encoder corresponding to the first communication condition in the first communication channel;

storing a value indicative of the first mode in a memory, the length M of which is selected responsive to an Adaptive Multi-Rate loop delay, where M is an integer;

comparing the value indicative of the first mode to a plurality of values previously stored in the memory, each of said plurality of values being indicative of one of a set of previous modes corresponding to one of a plurality of previously sensed communication conditions wherein, compared to the plurality of previously stored values, if the value indicative of the first mode indicates that the first communication condition is degraded relative to the plurality of previously sensed communication conditions, selecting said first mode as a candidate mode to be applied by said encoder; or is improved over at least one of the plurality of previously sensed communication conditions, selecting one of said previous modes as said candidate mode to be applied by said encoder;

receiving a value indicative of a second mode corresponding to a second communication condition in said second communication channel between said transport network and said second node; and selecting as a selected mode to be applied by said encoder the most robust one of said candidate mode and said second mode.

29. The method of claim 28, further comprising the step of providing an indication of the selected mode to the first node for adaptation of said encoder.

30. An arrangement operable to control the operation of an Adaptive Multi-Rate encoder operable to encode speech signals to be sent using Tandem Free Operation over a first communication channel and a second communication channel that can be connected in series via a transport network between a first node and a second node in a wireless communication system, the encoder being operable to encode the speech signals in at least two modes having different degrees of robustness, the arrangement comprising:

an analyzer operable to sense communication conditions in the first communication channel between the first node and the transport network;

a selector operable to identify modes applicable to said encoder corresponding to the communication conditions in the first communication channel;

a memory for storing values indicative of modes applicable to said encoder, the length M of the memory being selectable responsive to an Adaptive Multi-Rate loop delay, where M is an integer;

a filter unit operable to compare a first value indicative of a first mode corresponding to a first communication condition in the first communication channel to a plurality of values previously stored in the memory, each of said plurality of values being indicative of one of a set of previous modes corresponding to one of a plurality of previously sensed communication conditions in the first communication channel wherein, compared to the plurality of previously stored values, if the first value indicative of the first mode indicates that the first communication condition is degraded relative to the plurality of previously sensed communication conditions, the filter unit is operable to select said first mode as a candidate mode to be applied by said encoder; or is improved over at least one of the plurality of previously sensed communication conditions, the filter unit is operable to select one of said previous modes as said candidate mode to be applied by said encoder;

input means operable to receive a value indicative of a second mode corresponding to a second communication condition in said second communication channel;

a combiner operable to select as a selected mode to be applied by said encoder the most robust one of said candidate mode and said second mode; and output means operable to provide an indication of the selected mode to the first node for adaptation of said encoder.

31. An arrangement operable to control the operation of an Adaptive Multi-Rate encoder operable to encode speech signals to be sent using Tandem Free Operation over a first communication channel and a second communication channel that can be connected in series via a transport network between a first node and a second node in a wireless communication system, the encoder being operable to encode the speech signals in at least two modes having different degrees of robustness, the arrangement comprising:

a first input for receiving signal values representing communication conditions in the first communications channel between the first node and the transport network;

a memory for storing the signal values in memory locations, the memory having a length M of memory locations that is selected responsive to an Adaptive Multi-Rate loop delay, M being an integer;

a selector coupled to the memory locations for comparing a last received signal value to a plurality of previously received signal values that are currently stored in the memory locations, said last received signal value corresponding to a current communication condition in the first communication channel and each said plurality of previously received signal values corresponding to one of a plurality of previous communication conditions in the first communication channel wherein, as compared to the plurality of previously received signal values, if the last received signal value indicates that the current communication condition is degraded relative to the plurality of previous communication conditions, selecting a memory location containing said last received signal value; or is improved over at least one of the plurality of previous communication conditions, selecting a memory location containing one of said plurality of previously received signal values, the selector making memory selections according to a predetermined filter algorithm; and a switch, controlled by said selector, for switching the signal value contained in the selected memory location of the memory to be passed to a first output, said signal value contained in the selected memory location being indicative of a candidate mode to be applied by said encoder;

a second input for receiving a value indicative of a second mode corresponding to a second communication condition in said second communication channel;

a combiner operable to select as a selected mode to be applied by said encoder the most robust one of said candidate mode and said second mode; and a second output for providing an indication of the selected mode or a value indicative of the selected mode to the first node for adaptation of said encoder.

* * * * *